(12) United States Patent
Bai

(10) Patent No.: US 7,421,199 B2
(45) Date of Patent: Sep. 2, 2008

(54) SYSTEM AND METHOD FOR SUBCARRIER MODULATION AS SUPERVISORY CHANNEL

(76) Inventor: Yu Sheng Bai, 26288 W. Fremont Rd., Los Altos Hills, CA (US) 94022

( * ) Notice: Subject to any disclaimer, the term of this patent is extended or adjusted under 35 U.S.C. 154(b) by 0 days.

(21) Appl. No.: 11/833,956

(22) Filed: Aug. 3, 2007

(65) Prior Publication Data
US 2007/0274713 A1 Nov. 29, 2007

Related U.S. Application Data

(63) Continuation of application No. 10/800,371, filed on Mar. 12, 2004, now Pat. No. 7,274,872.

(51) Int. Cl.
*H04B 17/00* (2006.01)
(52) U.S. Cl. ............... 398/30; 398/31; 398/32; 398/33; 398/34; 398/25
(58) Field of Classification Search ............. 398/1–38, 398/95; 370/431–496
See application file for complete search history.

(56) References Cited

U.S. PATENT DOCUMENTS

| 5,390,185 | A | * | 2/1995 | Hooijmans et al. | 370/431 |
|---|---|---|---|---|---|
| 5,896,211 | A | | 4/1999 | Watanabe | |
| 6,108,113 | A | * | 8/2000 | Fee | 398/16 |
| 2003/0025957 | A1 | * | 2/2003 | Jayakumar | 359/110 |
| 2004/0171407 | A1 | * | 9/2004 | Ninomiya | 455/561 |

FOREIGN PATENT DOCUMENTS

| EP | 0598452 | 5/1994 |
|---|---|---|
| EP | 0702463 | 3/1996 |
| JP | 08-186536 | 7/1999 |

OTHER PUBLICATIONS

Sahin et al: "Dispersion Division Multiplexing for In-Band Subcarrier-Header-Based All-Optical Packet Switching", OFC, 2002, paper WO1, p. 279-280.*

(Continued)

*Primary Examiner*—Kenneth Vanderpuye
*Assistant Examiner*—Li Liu
(74) *Attorney, Agent, or Firm*—Townsend and Townsend and Crew LLP

(57) ABSTRACT

An apparatus and method for processing a supervisory signal for optical network applications. The apparatus includes a subcarrier transmission system configured to receive a first supervisory signal and output a second supervisory signal, and an electrical-to-optical conversion system configured to receive the second supervisory signal and a first data signal and output a first optical signal. Additionally, the apparatus includes an optical-to-electrical conversion system configured to receive the first optical signal and output a first electrical signal and a second data signal, and a subcarrier reception system configured to receive the first electrical signal and output a third supervisory signal. The second supervisory signal is associated with a first subcarrier frequency. The first data signal is associated with a first data bandwidth, and the first data bandwidth includes a first data frequency. A ratio of the first subcarrier frequency to the first data frequency ranges from 0.8 to 1.

35 Claims, 6 Drawing Sheets

OTHER PUBLICATIONS

Rohde et al: "Control modulation technique for client independent optical performance monitoring and transport of channel overhead", OFC 2002, Mar. 17-22, 2002, pp. 21-22.*

Petersen et al: "Online Chromatic Dispersion Monitoring and Compensation Using a Single In-band Subcarrier Tone", IEEE Photonics Technology Letters, vol. 14, No. 4, Apr. 2002, pp. 570-572.*

Park: "Self-Routing of Wavelength Packets Using an All-Optical Wavelength Shifter and QPSK Subcarrier Routing Control Headers", IEEE Photonics Technology Letters, vol. 8, No. 7, Jul. 1996, p. 938-940.*

Petersen et al., Petersen et al., "Dispersion monitoring and compensation using a single inband subcarrier tone," *Optical Fiber Communication Conference and Exhibit*, 2001. OFC 2001, vol. 3, pp. WH4-1- WH4-3.

Rohde et al., "Transparent performance monitoring and channel identification by new client independent control modulation technique," *Electronics Letters*, vol. 38, No. 12, Jun. 6, 2002, pp. 587-588.

* cited by examiner

SYSTEM AND METHOD FOR SUBCARRIER MODULATION AS SUPERVISORY CHANNEL

CROSS-REFERENCES TO RELATED APPLICATIONS

This application is a continuation of U.S. patent application Ser. No. 10/800,371, filed Mar. 12, 2004, which is commonly assigned and incorporated by reference herein for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates in general to telecommunication techniques. More particularly, the invention provides a method and system for subcarrier modulation as supervisory channel. Merely by way of example, the invention is described as it applies to optical networks, but it should be recognized that the invention has a broader range of applicability.

Telecommunication techniques have progressed through the years. As merely an example, optical networks have been used for conventional telecommunications in voice and other applications. The optical networks can transmit multiple signals of different capacities. For example, the optical networks terminate signals, multiplex signals from a lower speed to a higher speed, switch signals, and transport signals in the networks according to certain definitions.

To monitor these signals, the optical networks often track the flow of data through various nodes, switching sites and links. For example, the optical networks provide supervisory signals propagating with the data signals. The supervisory signals provide information for maintaining and monitoring the optical networks. Several conventional techniques have been proposed to transmit and receive such supervisory signals.

In Dense Wavelength Division Multiplexing (DWDM) systems, the supervisory signals are transmitted in a separate channel at a wavelength outside of the data band. For example, the supervisory channel is either at 1510 nm or 1620 nm outside the wavelength band for data signal transmissions. The data band is usually in the range of 1530 nm to 1562 nm for C-band or 1570 nm to 1610 nm for L-band. This transmission method may be a good solution if majority of the wavelength channels are deployed and the cost of the supervisory channel is shared by all data channels. But in many practical situations, especially in metro area Wavelength Division Multiplexing (WDM) applications, only a few channels are usually deployed. In these cases, the cost of a separate WDM supervisory channel becomes significant, and the solution is usually not cost effective.

Another method of carrying supervisory signals uses the Frequency Division Multiplexing (FDM) mechanism. The FDM method transmits the supervisory signals by subcarrier transmissions. The supervisory signals and the data signals are usually generated by the same transmitters and share the same wavelengths. The subcarrier frequency of the supervisory channel is outside of the bandwidth of the data signals. For example, the subcarrier frequency equals about 3 GHz for a baseband data rate up to 2.5 Gbps. To accommodate the high subcarrier frequency, the transmitters and receivers need to have a frequency response higher than one for transmitting only the data signals. Non-standard and high cost components are usually used. For example, a separate, higher speed, receiver may be used to detect the supervisory channel signal.

Similarly, the supervisory signals can be transmitted with a low frequency subcarrier or "pilot tone." Lowering the subcarrier frequency to the kHz or MHz range reduces the cost of components and the difficulty of implementation, but the performance of the supervisor signal is usually degraded.

Hence it is highly desirable to improve techniques for transmitting and receiving supervisor signals.

BRIEF SUMMARY OF THE INVENTION

The present invention relates in general to telecommunication techniques. More particularly, the invention provides a method and system for subcarrier modulation as supervisory channel. Merely by way of example, the invention is described as it applies to optical networks, but it should be recognized that the invention has a broader range of applicability.

According to one embodiment of the present invention, an apparatus for processing a supervisory signal for optical network applications includes a subcarrier transmission system configured to receive a first supervisory signal and output a second supervisory signal, and an electrical-to-optical conversion system configured to receive the second supervisory signal and a first data signal and output a first optical signal. Additionally, the apparatus includes an optical-to-electrical conversion system configured to receive the first optical signal and output a first electrical signal and a second data signal, and a subcarrier reception system configured to receive the first electrical signal and output a third supervisory signal. The second supervisory signal is associated with a first subcarrier frequency. The first data signal is associated with a first data bandwidth, and the first data bandwidth includes a first data frequency. At the first data frequency, a power density of the first data signal is substantially equal to zero. A ratio of the first subcarrier frequency to the first data frequency ranges from 0.8 to 1. The first optical signal is associated with a perturbation to the first data signal, and the perturbation is smaller than or equal to 1 dB. The first optical signal is associated with a signal-to-noise ratio related to the first supervisory signal, and the signal-to-noise ratio being larger than or equal to 20 dB. The first supervisory signal is associated with a first subcarrier data rate larger than 1 Mbps.

According to another embodiment of the present invention, an apparatus for processing a supervisory signal for optical network applications includes a subcarrier transmission system configured to receive a first supervisory signal and output a second supervisory signal, and an electrical-to-optical conversion system configured to receive the second supervisory signal and a first data signal and output a first optical signal. Additionally, the apparatus includes an optical-to-electrical conversion system configured to receive the first optical signal and output a first electrical signal and a second data signal, and a subcarrier reception system configured to receive the first electrical signal and output a third supervisory signal. Moreover, the apparatus includes an optical system coupled to the electrical-to-optical conversion system and the optical-to-electrical conversion system. The second supervisory signal is associated with a first subcarrier frequency, and the first data signal is associated with a first data bandwidth. The first data bandwidth includes a first data frequency, and at the first data frequency a power density of the first data signal is substantially equal to zero. A ratio of the first subcarrier frequency to the first data frequency ranges from 0.8 to 1.

According to yet another embodiment of the present invention, a method for processing a supervisory signal for optical network applications includes receiving a first supervisory signal, processing information associated with the first supervisory signal, and outputting a second supervisory signal based on at least information associated with the first supervisory signal. Additionally, the method includes receiving the second supervisory signal and a first data signal, processing information associated with the second supervisory signal and the first data signal, and outputting a first optical signal based on at least information associated with the second supervisory signal and the first data signal. Moreover, the method includes receiving the first optical signal, processing information associated with the first optical signal, and outputting a first electrical signal and a second data signal based on at least information associated with the first optical signal. Additionally, the method includes receiving the first electrical signal, processing information associated with the first electrical signal, and outputting a third supervisory signal. The second supervisory signal is associated with a first subcarrier frequency, and the first data signal is associated with a first data bandwidth. The first data bandwidth includes a first data frequency, and at the first data frequency a power density of the first data signal is substantially equal to zero. A ratio of the first subcarrier frequency to the first data frequency ranges from 0.8 to 1.

According to yet another embodiment of the present invention, an apparatus for transmitting a supervisory signal for optical network applications includes a subcarrier transmission system configured to receive a first supervisory signal and output a second supervisory signal, an electrical-to-optical conversion system configured to receive the second supervisory signal and a first data signal and output a first optical signal. The second supervisory signal is associated with a first subcarrier frequency, and the first data signal is associated with a first data bandwidth. The first data bandwidth includes a first data frequency, and at the first data frequency a power density of the first data signal is substantially equal to zero. A ratio of the first subcarrier frequency to the first data frequency ranges from 0.8 to 1.

According to yet another embodiment of the present invention, an apparatus for receiving a supervisory signal for optical network applications includes an optical-to-electrical conversion system configured to receive a first optical signal and output a first electrical signal and a second data signal, and a subcarrier reception system configured to receive the first electrical signal and output a third supervisory signal. The subcarrier reception system includes a band pass filter associated with a first subcarrier frequency, and the second data signal is associated with a first data bandwidth. The first data bandwidth includes a maximum data frequency. A ratio of the first subcarrier frequency to the maximum data frequency ranges from 0.8 to 1.

According to yet another embodiment of the present invention, a method for transmitting a supervisory signal for optical network applications includes receiving a first supervisory signal, processing information associated with the first supervisory signal, and outputting a second supervisory signal based on at least information associated with the first supervisory signal. Additionally, the method includes receiving the second supervisory signal and a first data signal, processing information associated with the second supervisory signal and the first data signal, and outputting a first optical signal based on at least information associated with the second supervisory signal and the first data signal. The second supervisory signal is associated with a first subcarrier frequency, and the first data signal is associated with a first data bandwidth. The first data bandwidth includes a first data frequency, and at the first data frequency a power density of the first data signal is substantially equal to zero. A ratio of the first subcarrier frequency to the first data frequency ranges from 0.8 to 1.

According to yet another embodiment of the present invention, a method for receiving a supervisory signal for optical network applications includes receiving a first optical signal, processing information associated with the first optical signal, and outputting a first electrical signal and a second data signal based on at least information associated with the first optical signal. Additionally, the method includes receiving the first electrical signal, processing information associated with the first electrical signal, and outputting a third supervisory signal. The processing information associated with the first electrical signal includes filtering the first electrical signal, and the filtering the first electrical signal is associated with a first subcarrier frequency. The second data signal is associated with a first data bandwidth, and the first data bandwidth includes a maximum data frequency. A ratio of the first subcarrier frequency to the maximum data frequency ranges from 0.8 to 1.

Many benefits are achieved by way of the present invention over conventional techniques. For example, certain embodiments of the present invention use a subcarrier frequency that is slightly lower than the maximum frequency of the frequency band of the data signal 250 or 450. The subcarrier power spectrum overlaps with the tail of the data power spectrum. The data power density at the tail is substantially lower than that at a low frequency. For example, the low frequency is in the range of kHz or MHz. Some embodiments of the present invention provide a subcarrier signal that shares with the data signal some or all of the optical-to-electrical signal converter, the electrical-to-optical signal converter, and other optical-to-electrical or electrical-to-optical conversion components. Certain embodiments of the present invention significantly lower costs for transmitting and receiving supervisory signals. Some embodiments of the present invention provide a low data power density at $f_{SC}$. The supervisory signal has a high signal to noise ratio and can be transmitted at a high data rate. For example, the data rate is higher than 1 Mbps. Certain embodiments of the present invention provide a subcarrier modulation with a low amplitude. The main data channel suffers from only a small perturbation. For example, the perturbation in optical power is smaller than 1 dB. Some embodiments of the present invention provide a simple configuration and an easy implementation.

Various additional objects, features and advantages of the present invention can be more fully appreciated with reference to the detailed description and accompanying drawings that follow.

DETAILED DESCRIPTION OF THE INVENTION

The present invention relates in general to telecommunication techniques. More particularly, the invention provides a method and system for subcarrier modulation as supervisory channel. Merely by way of example, the invention is described as it applies to optical networks, but it should be recognized that the invention has a broader range of applicability.

At low frequency, subcarrier modulation can be used as supervisory channel. The subcarrier frequency overlaps with the main data spectrum, so the latter acts as a high-level noise source to subcarrier signals. Limited by the high spectral density of data signals, the low-frequency subcarrier modulation usually supports a transmission rate for the supervisory signals only in the kbps range. For example, the supervisory channel has a transmission rate of 9.6 kbps. In modern optical networks, the terminal nodes often require communications faster than kbps.

Figure 1:
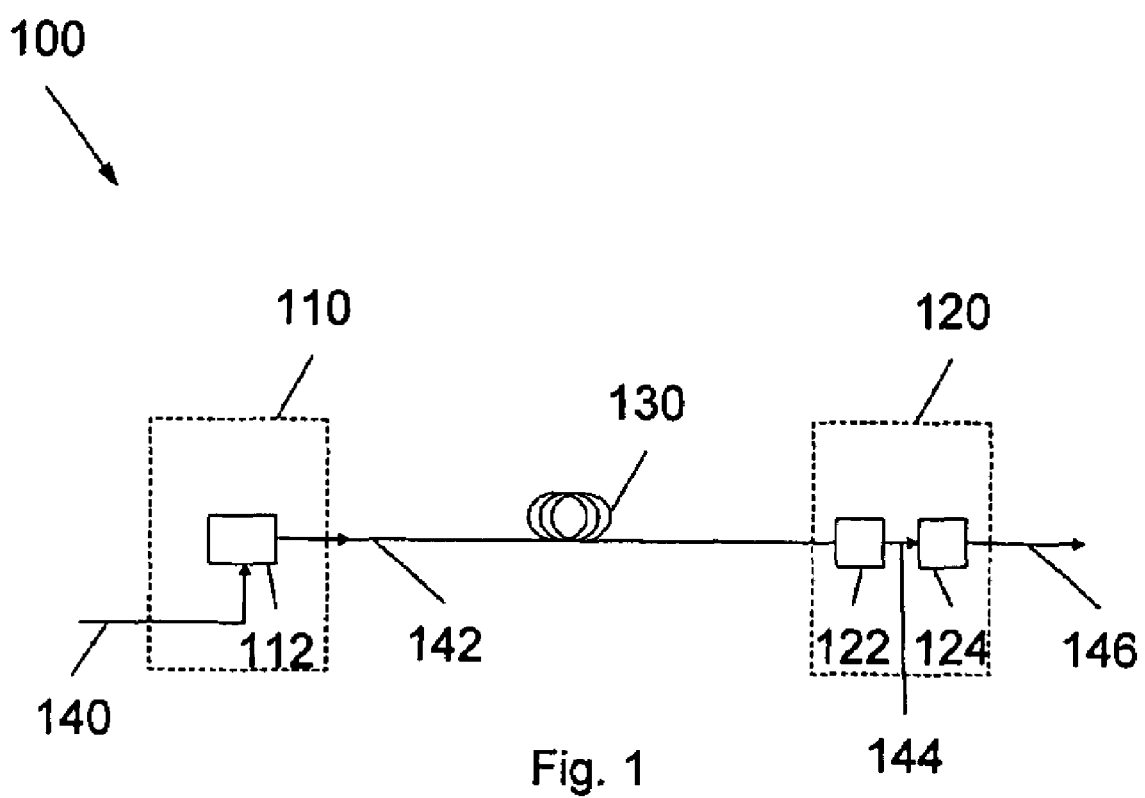
FIG. 1 is a simplified optical network connection.

FIG. 1 is a simplified optical network connection. An optical network connection 100 includes a transmitter system 110, a receiver system 120, and an optical link 130. The transmitter system 110 includes an electrical-to-optical signal converter 112. The receiver system 120 includes an optical-to-electrical signal converter 122 and a clock and data recovery system 124. The optical-to-electrical signal converter receives a data signal 140. At the transmitter system 110, the data signal is converted into an optical signal 142. The optical signal 142 is transmitted through the optical link 130 and then received by the receiver system 120. For example, the optical link 130 includes optical fibers. At the receiver system 120, the optical signal 142 is converted to an electrical signal 144, which often contains signal distortions. These signal distortions are reduced by the clock and data recovery system 124. The clock and data recovery system 124 generates a data signal 146, which is substantially a replica of the data signal 140.

Figure 2:
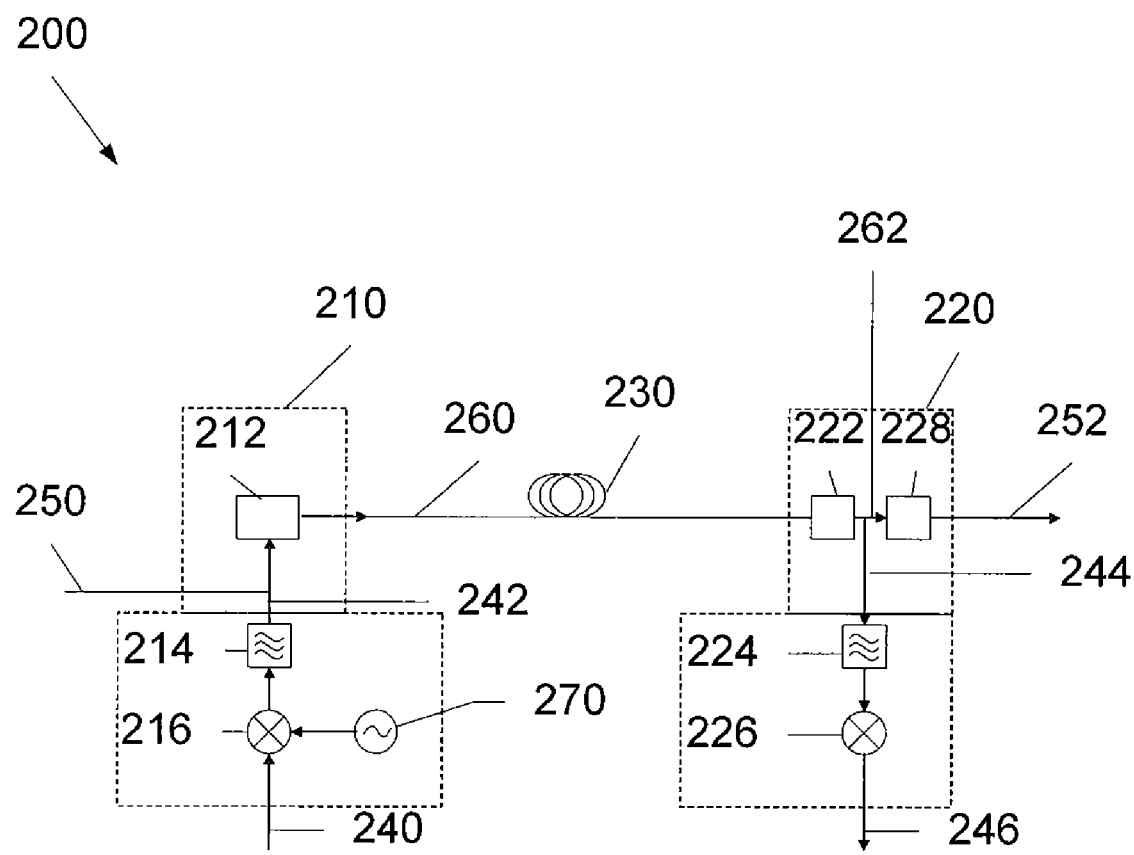
FIG. 2 is a simplified optical network connection according to an embodiment of the present invention.

FIG. 2 is a simplified optical network connection according to an embodiment of the present invention. The diagram is merely an example, which should not unduly limit the scope of the present invention. One of ordinary skill in the art would recognize many variations, alternatives, and modifications. An optical connection 200 includes a transmitter system 210, a receiver system 220, and an optical link 230. The transmitter system 210 includes an electrical-to-optical signal converter 212, an RF band pass filter 214, and an RF modulator 216. The receiver system 220 includes an optical-to-electrical signal converter 222, an RF band pass filter 224, an RF demodulator 226, and a clock and data recovery system 228. For example, the RF band pass filter 214 and the RF modulator 216 form a subcarrier transmitter system. In another example, the RF band pass filter 224 and the RF demodulator 226 forms a subcarrier receiver system. Although the above has been shown using systems 210, 212, 214, 216, 220, 222, 224, 226, 228, and 230, there can be many alternatives, modifications, and variations. Some of the systems may be combined. Other systems may be added to the optical connection 200. Depending upon the embodiment, one or more of the systems may be replaced. Further details of these systems are found throughout the present specification and more particularly below.

The RF modulator 216 receives a supervisory signal 240 and modulates an RF source 270. For example, the supervisory signal 240 is generated by a control circuit. In another example, the RF source 270 has a frequency of about 2.4 GHz. At the RF modulator 216, the RF signal is modulated according to the base band supervisory signal 240. The modulation format can be Amplitude-Shift Keying (ASK), Frequency-Shift Keying (FSK), or Phase-Shift Keying (PSK). The modulated subcarrier signal then passes the RF band pass filter 214. The RF band pass filter 214 has a center frequency substantially equal to that of the RF source 270, and a transmission bandwidth substantially equal to the supervisory signal bandwidth.

At the electrical-to-optical signal converter 212, a data signal 250 is combined with the subcarrier signal 242. The combined signal is converted into an optical signal 260. For example, the frequency of the subcarrier signal 242 falls within the frequency response range of the electrical-to-optical signal converter 212. In another example, the electrical-to-optical converter 212 has a frequency response range up to 2.5 Gbps. In yet another example, the electrical-to-optical signal converter 212 is an analog system, whose output signal level is proportional to the input signal level. The optical signal 260 is a superposition of the optical power corresponding to the data signal 250 and the optical power corresponding to the subcarrier signal 242. The ratio between the subcarrier signal 242 and the data signal 250 in terms of optical power is in the range of 1% to 10%. This ratio is often referred to as subcarrier modulation depth.

The optical signal 260 is transmitted through the optical link 230 and received by the receiver system 220. For example, the optical link 230 includes optical fibers. At the receiver system 220, the optical signal 260 is converted to an electrical signal 262 by the optical-to-electrical signal converter 222. A portion 244 of the signal 262 passes through the RF band pass filter 224 and enters the RF demodulator 226. The RF band pass filter allows only the signal frequency components around the subcarrier frequency to pass, and rejects substantially all other frequency components. At the RF demodulator 226, the band passed signal is demodulated through Amplitude-Shift Keying (ASK), Frequency-Shift Keying (FSK), or Phase-Shift Keying (PSK). The RF demodulator 226 then outputs a base band supervisory signal 246. The supervisor signal 246 is substantially a replica of the supervisory signal 240. For example, the supervisory signal 246 is sent to a control circuit. Additionally, the other portion of the signal 262 is received by the clock and data recovery system 228. The clock and data recovery system 228 reduces signal distortions and generates a data signal 252. The data signal 252 is substantially a replica of the data signal 250.

Figure 3:
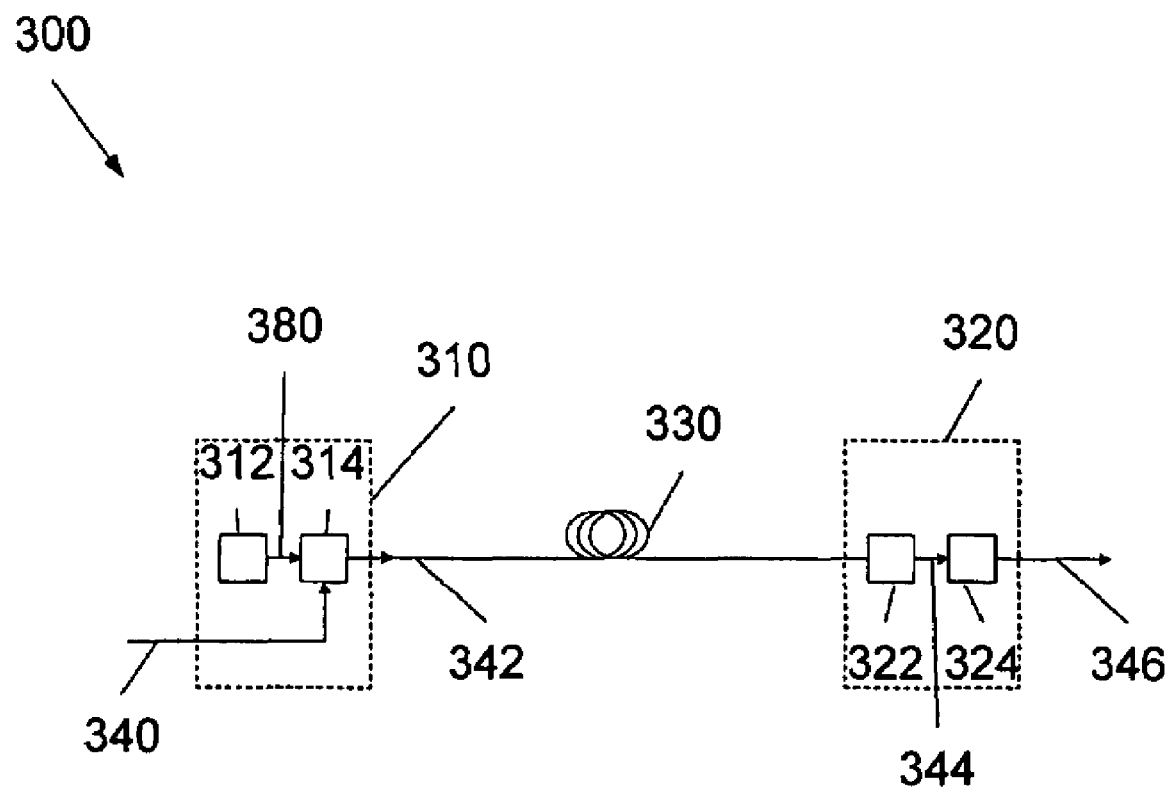
FIG. 3 is a simplified optical network connection.

FIG. 3 is a simplified optical network connection. An optical network connection 300 includes a transmitter system 310, a receiver system 320, and an optical link 330. The transmitter system 310 includes a laser source 312 and an electrical-to-optical signal modulator 314. The receiver system 320 includes an optical-to-electrical signal converter 322 and a clock and data recovery system 324. The laser source 312 provides a Continuous Wave (CW) light 380 to the electrical-to-optical signal modulator 314. For example, the laser source 312 includes a laser diode. The modulator modulates the CW light 380 with a received data signal 340 and converts the received data signal 340 into an optical signal 342. The optical signal 342 is transmitted through the optical link 330 and then received by the receiver system 330. For example, the optical link 330 includes optical fibers. At the receiver system 330, the optical signal 342 is converted to an electrical signal 344, which often contains signal distortions. These signal distortions are reduced by the clock and data recovery system 324. The clock and data recovery system 324 generates a data signal 346, which is substantially a replica of the data signal 340.

Figure 4:
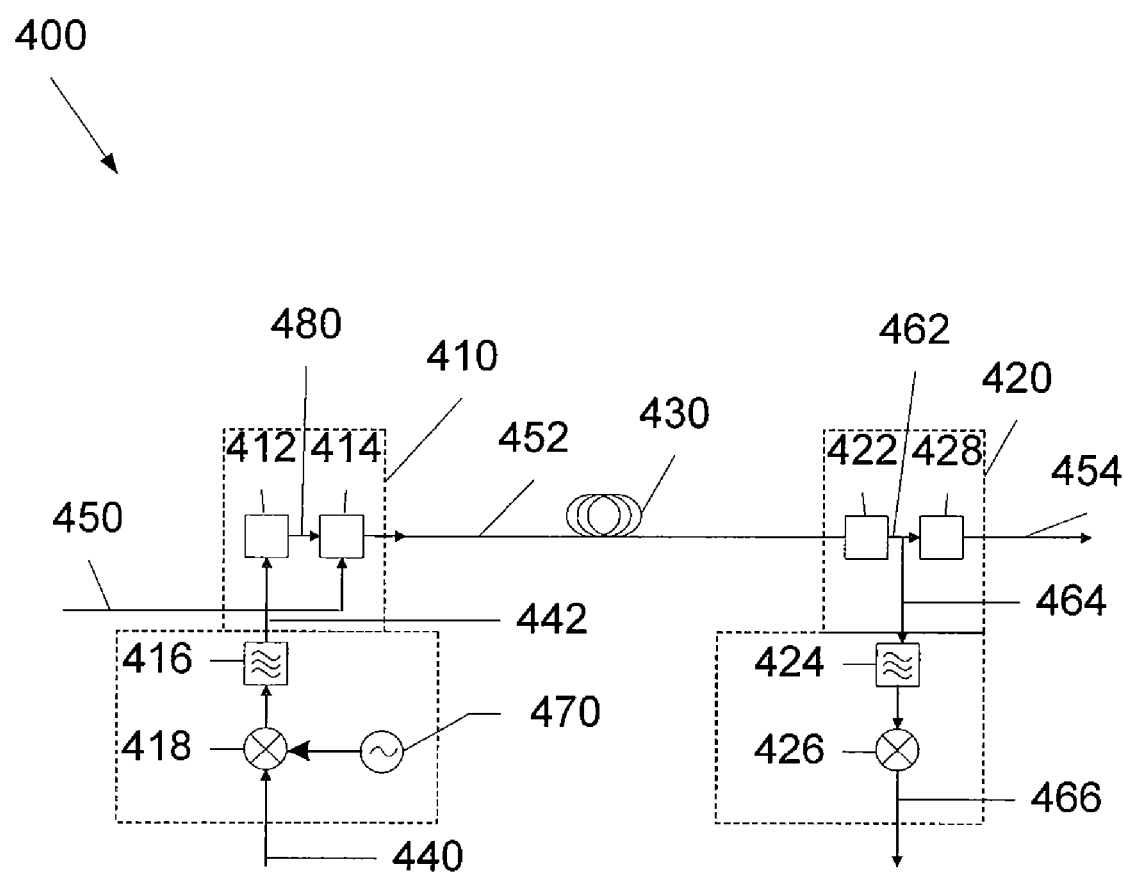
FIG. 4 is a simplified optical network connection according to another embodiment of the present invention.

FIG. 4 is a simplified optical network connection according to another embodiment of the present invention. The diagram is merely an example, which should not unduly limit the scope of the present invention. One of ordinary skill in the art would recognize many variations, alternatives, and modifications. An optical connection 400 includes a transmitter system 410, a receiver system 420, and an optical link 430. The transmitter system 410 includes a laser source 412, an electrical-to-optical signal modulator 414, an RF band pass filter 416, and an RF modulator 418. For example, the laser source 412 includes a laser diode. The receiver system 420 includes an optical-to-electrical signal converter 422, an RF band pass filter 424, an RF demodulator 426, and a clock and data recovery system 428. For example, the RF band pass filter 416 and the RF modulator 418 forms a subcarrier transmitter system. In another example, the RF band pass filter 424 and the RF demodulator 426 forms a subcarrier receiver system. Although the above has been shown using systems 410, 412, 414, 416, 418, 420, 422, 424, 426, 428, and 430, there can be many alternatives, modifications, and variations. Some of the systems may be combined. For example, the laser source 412 and the electrical-to-optical signal modulator 414 are combined. Other systems may be added to the optical connection 400. Depending upon the embodiment, one or more of the systems may be replaced. Further details of these systems are found throughout the present specification and more particularly below.

The RF modulator 418 receives a supervisory signal 440 and modulates an RF source 470. For example, the supervisory signal 440 is generated by a control circuit. At the RF modulator 418, the RF signal is modulated according to the base band supervisory signal 440. The modulation format can be Amplitude-Shift Keying (ASK), Frequency-Shift Keying (FSK), or Phase-Shift Keying (PSK). The modulated subcarrier signal then passes the RF band pass filter 416. The RF band pass filter 416 has a center frequency substantially equal to that of the RF source 470, and a transmission bandwidth substantially equal to the supervisory signal bandwidth.

The laser source 412 receives the subcarrier signal 442 and generates a laser signal 480. The subcarrier signal 442 modulates the intensity of the laser signal 480. For example, the laser source 412 includes a laser diode. The laser signal is provided to the electrical-to-optical signal modulator 414. The modulator 414 modulates the laser signal with a received data signal 450 and converts the received data signal 450 into an optical signal 452. For example, the subcarrier signal 442 has a frequency ranging from 2.4 to 2.5 GHz, which falls within the frequency response range of the laser source 412 and the electrical-to-optical signal modulator 414. In yet another example, the subcarrier modulation depth is in the range of 1% to 10%.

The optical signal 452 is transmitted through the optical link 430 and received by the receiver system 420. For example, the optical link 430 includes optical fibers. At the receiver system 420, the optical signal 452 is converted to an electrical signal 462 by the optical-to-electrical signal converter 422. A portion 464 of the signal 462 passes through the RF band pass filter 424 and enters the RF demodulator 426. The RF band pass filter allows only the signal frequency components around the subcarrier frequency to pass, and rejects substantially all other frequency components. At the RF demodulator 426, the band passed signal is demodulated through Amplitude-Shift Keying (ASK), Frequency-Shift Keying (FSK), or Phase-Shift Keying (PSK). The RF demodulator 426 then outputs a base band supervisory signal 466. The supervisor signal 466 is substantially a replica of the supervisory signal 440. For example, the supervisor signal 466 is sent to a control circuit. Additionally, the other portion of the signal 462 is received by the clock and data recovery system 428. The clock and data recovery system 428 reduces signal distortions and generates a data signal 454. The data signal 454 is substantially a replica of the data signal 450.

As discussed above and shown in FIGS. 2 and 4, the data signals 250 and 450 act as noise to the subcarrier signals 240 and 440 respectively. At the subcarrier frequency, the spectral density of the data signals 250 and 450 is substantially lower than the spectral density of the subcarrier signals 240 and 440 respectively.

In certain embodiments as shown in FIGS. 2 and 4, the data signal 250 or 450 is transmitted in the form of Non-Return to Zero (NRZ) format. According to the NRZ format, the binary 0 corresponds to −1.0 volt and the binary 1 corresponds to +1.0 volt at the output 262 or 462 of the optical-to-electrical signal converter 222 or 422 respectively. The average power of the data signal 250 or 450 is then $$P_{DATA} = \frac{1.0^2}{R} \quad \text{(Equation 1)}$$

where R is the output load impedance of the optical-to-electrical signal converter 222 or 422. For example, R is equal to about 50 ohms. The data signal 250 or 450 is superposed with a subcarrier signal 240 or 440 with the following format:

$$V_{SC}(t) = A_{SC} \times \sin(2\pi \times f_{SC} \times t + \phi) \quad \text{(Equation 2)}$$

where $V_{SC}$, $A_{SC}$ and $f_{SC}$ are voltage, amplitude, and frequency of the subcarrier signal 240 or 440 respectively. $\phi$ represents a constant phase, and t represents time. The subcarrier signal 240 or 440 can be transmitted through Amplitude-Shift Keying (ASK) by the modulation of $A_{SC}$, Frequency-Shift Keying (FSK) by the modulation of $f_{SC}$, or Phase-Shift Keying (PSK) by the modulation of $\phi$. For FSK or PSK, $A_{SC}$ is a constant. The average power of subcarrier signal is given by $$P_{SC} = \frac{0.5 \times A_{SC}^2}{R} \quad \text{(Equation 3)}$$

To reduce perturbation to the data signal 240 or 440, the subcarrier signal 240 or 440 is limited to cause no more than ±20% broadening of the "0" and "1" levels at the output 262 or 462. Specifically, $$A_{SC} = 20\% \times 1.0 = 0.2 \text{ (volt)} \quad \text{(Equation 4)}$$

The above perturbation usually causes 1 dB "eye" penalty as commonly used in telecommunication industry. The 1 dB "eye" penalty usually causes the sensitivity of a receiver to degrade by 1 dB. Correspondingly, the maximum power of the subcarrier signal 240 or 440 is given by $$P_{SC} = \frac{0.5 \times 0.2^2}{R} = 2\% \times P_{DATA} \quad \text{(Equation 5)}$$

Hence the maximum power of the subcarrier signal 240 or 440 should be no more than 2% of the average power of the data signal 250 or 450. With this limitation on the subcarrier modulation, the maximum subcarrier data rate is determined by the Signal-to-Noise Ratio (SNR) limit.

For in-band subcarrier transmission, the subcarrier frequency is within the frequency band of the data signal 250 or 450. The spectrum of the data signal 250 or 450 acts as a noise to the subcarrier signal 240 or 440. The SNR of the subcarrier signal is therefore given by the ratio between the spectral density of the subcarrier signal and the spectral density of the data signal.

Figure 5:
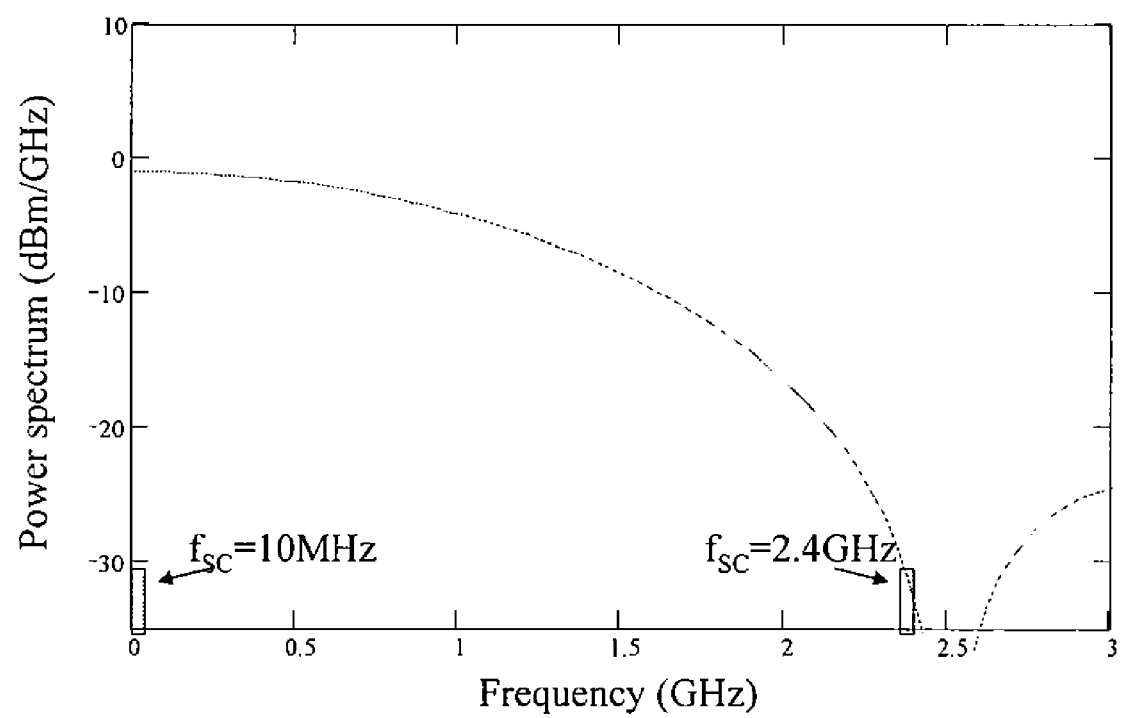
FIG. 5 is a simplified power spectrum of a data signal and a supervisory signal according to an embodiment of the present invention.

FIG. 5 is a simplified power spectrum of a data signal and a supervisory signal according to an embodiment of the present invention. The power spectrum in FIG. 5 may be implemented with the system 200 or 400 as shown in FIG. 2 or 4 respectively. FIG. 5 is merely an example, which should not unduly limit the scope of the present invention. One of ordinary skill in the art would recognize many variations, alternatives, and modifications. For example, the data signal is in the NRZ format. The data rate of the date signal is 2.5 Gigabits per second (Gbps). The data power density decreases with increasing frequency and falls to almost zero at about 2.5 GHz. To select the subcarrier signal, an RF band pass filter 224 or 424 is used with a −3 dB transmission bandwidth substantially equal to the subcarrier data rate as follows.

$$\Delta f_{SC} = R_{SC} \quad \text{(Equation 6)}$$

where $\Delta f_{SC}$ is the −3 dB transmission bandwidth of the RF band pass filter 224 or 424, and $R_{SC}$ is the subcarrier data rate. The RF band pass filter 224 or 424 allows the subcarrier signal and a portion of the data signal to pass through. The passed portion of the data signal acts as a noise causing degradation in the subcarrier signal. In the frequency domain, the subcarrier signal power passing the band pass filter is given by $$P_{SC} \approx \rho_{SC}(f_{SC}) \times R_{SC} \quad \text{(Equation 7)}$$

where $P_{SC}$ is the subcarrier power, and $\rho_{SC}(f_{SC})$ is the subcarrier power density at the subcarrier frequency. Also in the frequency domain, the noise power from the data signal passing the band pass filter is $$P_N \approx \rho_{DATA}(f_{SC}) \times R_{SC} \quad \text{(Equation 8)}$$

$P_N$ is the noise power, and $\rho_{DATA}(f_{SC})$ is the noise power density at the subcarrier frequency. The SNR for the subcarrier signal is then given by $$SNR = \frac{P_{SC}}{P_N} = \frac{\rho_{SC}(f_{SC})}{\rho_{DATA}(f_{SC})} = \frac{P_{SC}}{R_{SC} \times \rho_{DATA}(f_{SC})} \quad \text{(Equation 9)}$$

SNR is inversely proportional to the subcarrier data rate $R_{SC}$. As shown in FIG. 5, when subcarrier frequencies are in the range of kHz or MHz, the spectral density $\rho_{DATA}$ can be approximated as follows.

$$\rho_{DATA}(f_{SC}) \approx \rho_{DATA}(0) \quad \text{(Equation 10)}$$

Additionally, the total data signal power, $\rho_{DATA}$, is equal to the integration of $\rho_{DATA}$ in the frequency space. From FIG. 5, it can be seen that this is approximately given by $$P_{DATA} \approx \rho_{DATA}(0) \times 0.5 \times R_{DATA} \quad \text{(Equation 11)}$$

where $R_{DATA}$ is the main data rate for the data signal. With Equations 9-11 and Equation 5, the SNR for the subcarrier signal is derived as $$SNR = \frac{P_{SC}}{R_{SC} \times \frac{P_{DATA}}{(0.5 \times R_{DATA})}} = 1\% \times R_{DATA}/R_{SC} \quad \text{(Equation 12)}$$

For high quality detection, SNR should equal at least 20 dB for certain embodiments. Specifically, $$SNR = 100 \quad \text{(Equation 13)}$$

Hence the subcarrier data rate $R_{SC}$ and the main data rate $R_{DATA}$ have the following relation:

$$R_{SC} \leq 10^{-4} \times R_{DATA} \quad \text{(Equation 14)}$$

Equation 14 provides the limitation on the subcarrier data rate in order to satisfy both Equations 4 and 13. Equations 4 is usually required for high quality detection of data signal, and Equations 13 is usually required for high quality detection of subcarrier signal. To simultaneously transmit both data and subcarrier signals, both conditions should usually be satisfied. For example, the main data rate equals 2.5 Gbps, and the subcarrier data rate should be no higher than 250 kbps. In another example, the main data rate equals 100 Mbps, and the maximum subcarrier data rate should be no higher than 10 kbps.

In contrast, when the subcarrier frequency is increased from the range of kHz or MHz to the range of GHz, e.g., 2.4 GHz, the maximum subcarrier data rate can be significantly improved. For example, as shown in FIG. 5, the noise power density at $f_{SC}$=2.4 GHz is about 26 dB lower than that at $f_{SC}$ in the range of kHz-MHz, i.e., $\rho_{DATA}(2.4\,\text{GHz}) = 10^{-2.6}\,\rho_{DATA}(0)$. As a result, the SNR is 26 dB higher for a given subcarrier data rate according to Equation 9, and the maximum subcarrier data rate can be increased to about 100 Mbps to obtain the desired 20 dB SNR. Alternatively, if the maximum subcarrier data rate is not used, the subcarrier modulation depth and the perturbation to the data signal may be reduced.

Figure 6:
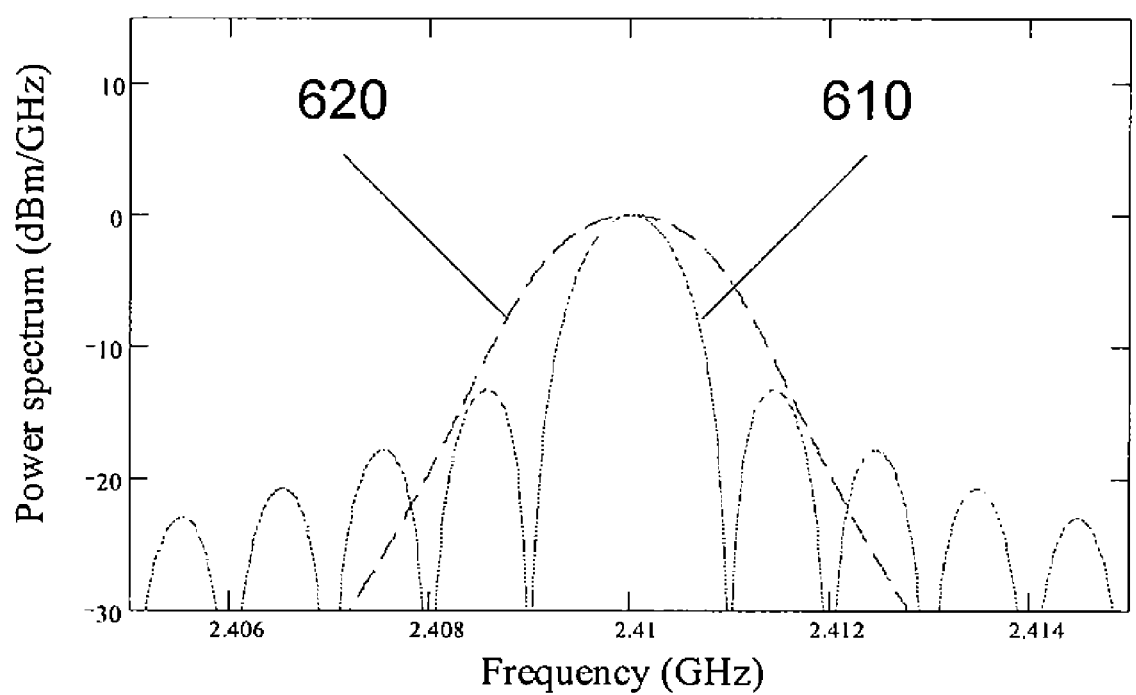
FIG. 6 is a simplified power spectrum of a subcarrier signal and a simplified band limiting characteristic of a band pass filter according to an embodiment of the present invention.

FIG. 6 is a simplified power spectrum of a subcarrier signal and a simplified band limiting characteristic of a band pass filter according to an embodiment of the present invention. The diagram is merely an example, which should not unduly limit the scope of the present invention. One of ordinary skill in the art would recognize many variations, alternatives, and modifications. The subcarrier signal has a power spectrum 610. For example, the power spectrum 610 is associated with a data rate of 1 Mbps at a subcarrier frequency of 2.41 GHz. The RF band pass filter has a band limiting characteristic 620. For example, the band limiting characteristic 620 has a Full-Width Half-Maximum (FWHM) equal to 1.6 MHz centered at 2.41 GHz. The RF band pass filter can be used as the RF band pass filter 214, 224, 416, or 424.

As discussed above and further emphasized here, FIGS. 5 and 6 are merely examples, which should not unduly limit the scope of the present invention. One of ordinary skill in the art would recognize many variations, alternatives, and modifications. For example, the data power density falls to almost zero at a frequency equal to, lower than, or higher than 2.5 GHz. The subcarrier frequency is selected to be a certain percentage of the frequency at which the data power density falls to almost zero. For example, the percentage ranges from 80% to 100%.

According to another embodiment of the present invention, a method for processing a supervisory signal for optical network applications includes receiving a first supervisory signal, processing information associated with the first supervisory signal, and outputting a second supervisory signal based on at least information associated with the first supervisory signal. Additionally, the method includes receiving the second supervisory signal and a first data signal, processing information associated with the second supervisory signal and the first data signal, and outputting a first optical signal based on at least information associated with the second supervisory signal and the first data signal. Moreover, the method includes receiving the first optical signal, processing information associated with the first optical signal, and outputting a first electrical signal and a second data signal based on at least information associated with the first optical signal. Additionally, the method includes receiving the first electrical signal, processing information associated with the first electrical signal, and outputting a third supervisory signal. The second supervisory signal is associated with a first subcarrier frequency, and the first data signal is associated with a first data bandwidth. The first data bandwidth includes a first data frequency, and at the first data frequency a power density of the first data signal is substantially equal to zero. A ratio of the first subcarrier frequency to the first data frequency ranges from 0.8 to 1.

According to yet another embodiment of the present invention, a method for transmitting a supervisory signal for optical network applications includes receiving a first supervisory signal, processing information associated with the first supervisory signal, and outputting a second supervisory signal based on at least information associated with the first supervisory signal. Additionally, the method includes receiving the second supervisory signal and a first data signal, processing information associated with the second supervisory signal and the first data signal, and outputting a first optical signal based on at least information associated with the second supervisory signal and the first data signal. The second supervisory signal is associated with a first subcarrier frequency, and the first data signal is associated with a first data bandwidth. The first data bandwidth includes a first data frequency, and at the first data frequency a power density of the first data signal is substantially equal to zero. A ratio of the first subcarrier frequency to the first data frequency ranges from 0.8 to 1.

According to yet another embodiment of the present invention, a method for receiving a supervisory signal for optical network applications includes receiving a first optical signal, processing information associated with the first optical signal, and outputting a first electrical signal and a second data signal based on at least information associated with the first optical signal. Additionally, the method includes receiving the first electrical signal, processing information associated with the first electrical signal, and outputting a third supervisory signal. The processing information associated with the first electrical signal includes filtering the first electrical signal, and the filtering the first electrical signal is associated with a first subcarrier frequency. The second data signal is associated with a first data bandwidth, and the first data bandwidth includes a maximum data frequency. A ratio of the first subcarrier frequency to the maximum data frequency ranges from 0.8 to 1.

The present invention has various advantages. Certain embodiments of the present invention use a subcarrier frequency that is slightly lower than the maximum frequency of the frequency band of the data signal 250 or 450. The subcarrier power spectrum overlaps with the tail of the data power spectrum. The data power density at the tail is substantially lower than that at a low frequency. For example, the low frequency is in the range of kHz or MHz. Some embodiments of the present invention provide a subcarrier signal that shares with the data signal some or all of the optical-to-electrical signal converter, the electrical-to-optical signal converter, and other optical-to-electrical or electrical-to-optical conversion components. Certain embodiments of the present invention significantly lower costs for transmitting and receiving supervisory signals. Some embodiments of the present invention provide a low data power density at $f_{SC}$. The supervisory signal has a high signal to noise ratio and can be transmitted at a high data rate. For example, the data rate is higher than 1 Mbps. Certain embodiments of the present invention provide a subcarrier modulation with a low amplitude. The main data channel suffers from only a small perturbation. For example, the perturbation in optical power is smaller than 1 dB. Some embodiments of the present invention provide a simple configuration and an easy implementation.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An apparatus for processing a supervisory signal for optical network applications, the apparatus comprising:
   a subcarrier transmission system including a modulator, a radio-frequency (RF) source, and a first RF band-pass filter, the RF source generating a RF signal, the modulator being configured to receive a first supervisory signal and the RF signal and output a modulated RF signal based on the first supervisory signal, the first RF band-pass filter being configured to filter the modulated RF signal and output a second supervisory signal;
   an electrical-to-optical conversion system configured to receive the second supervisory signal and a first data signal and output a first optical signal;
   an optical-to-electrical conversion system configured to receive the first optical signal and output a first electrical signal, the first electric signal including information associated with the first data signal and the second supervisory signal;
   a subcarrier reception system including a second RF band-pass filter and a demodulator, the second RF band-pass filter being configured to receive and filter a portion of the first electrical signal, the demodulator being configured to receive the filtered portion of the first electric signal and output a third supervisory signal that is substantially the same as the first supervisory signal;
   an optical system coupled to the electrical-to-optical conversion system and the optical-to-electrical conversion system;
   wherein the second supervisory signal is associated with a first subcarrier frequency of the RF signal;
   wherein the first RF band-pass filter and the second RF band-pass filter are substantially the same with a —3 dB transmission bandwidth equal to a data rate of the first supervisory signal and a center frequency at the first subcarrier frequency;
   wherein the first data signal is associated with a first data bandwidth, the first data bandwidth including a first data frequency, at the first data frequency a power density of the first data signal substantially equal to zero;
   wherein a ratio of the first subcarrier frequency to the first data frequency ranges from 0.8 to 1.

2. The apparatus of claim 1 wherein:
   the first optical signal is associated with a perturbation related to the first data signal, the perturbation being smaller than or equal to 1 dB;

the first optical signal is associated with a signal-to-noise ratio for the second supervisory signal related to the first supervisory signal, the signal-to-noise ratio being larger than or equal to 20 dB.

3. The apparatus of claim 2 wherein the first supervisory signal is associated with a first supervisory data rate larger than 1 Mbps.

4. The apparatus of claim 3 wherein the first supervisory data rate is about 5 Mbps.

5. The apparatus of claim 1 wherein the optical-to-electrical conversion system comprises:
an optical-to-electrical signal converter configured to receive the first optical signal and configured to output the first electrical signal;
a clock and recovery system configured to receive a portion of the first electrical signal and output the second data signal;
wherein the second data signal is substantially the same as the first data signal.

6. The apparatus of claim 1 wherein the electrical-to-optical conversion system comprises:
a laser source configured to receive the second supervisory signal for generating a laser signal;
an electrical-to-optical modulator coupled to the laser source and configured to receive at least the first data signal for modulating the laser signal and output the first optical signal.

7. A method for processing a supervisory signal for optical network applications, the method comprising:
receiving a first supervisory signal;
generating a RF signal having a subcarrier frequency;
modulating the RF signal based on the first supervisory signal;
processing information associated with the modulated RF signal by filtering through a first RF band-pass filter, the first RF band-pass filter having a —3 dB transmission bandwidth substantially equal to a data rate of the first supervisory signal;
outputting a second supervisory signal;
receiving the second supervisory signal and a first data signal;
processing information associated with the second supervisory signal and the first data signal;
outputting a first optical signal based on at least information associated with the second supervisory signal and the first data signal;
receiving the first optical signal;
processing information associated with the first optical signal;
outputting a first electrical signal based on at least information associated with the first optical signal;
filtering a portion of the first electric signal through a second RF band-pass filter, the second RF band-pass filter being substantially the same as the first RF band-pass filter;
processing information associated with the filtered portion of the first electrical signal;
outputting a third supervisory signal;
wherein the second supervisory signal is associated with the subcarrier frequency;
wherein the first data signal is associated with a first data bandwidth, the first data bandwidth including a first data frequency, at the first data frequency a power density of the first data signal substantially equal to zero;
wherein a ratio of the subcarrier frequency to the first data frequency ranges from 0.8 to 1.

8. The method of claim 7 wherein the first data frequency is a maximum frequency associated with the first data bandwidth.

9. The method of claim 8 wherein the first data frequency is substantially equal to 2.5 GHz and the subcarrier frequency is substantially equal to 2.4 GHz.

10. The method of claim 9 wherein the first data signal is associated with a non-return to zero format and a first data rate substantially equal to or smaller than 2.5 gigabits per second.

11. The method of claim 7 wherein the processing information associated with the filtered portion of the first electrical signal comprises:
demodulating the filtered portion of the first electrical signal.

12. The method of claim 7 further comprising:
sending another portion of the first electrical signal to a clock and recovery system;
reducing signal distortion associated with the first electrical signal; and
outputting a second electrical signal, the second electrical signal including substantially the same information of the first data signal.

13. The method of claim 7 wherein the processing information associated with the second supervisory signal and the first data signal comprises:
generating a laser signal in response to at least the second supervisory signal;
modulating the laser signal with the first data signal;
converting the modulated laser signal to the first optical signal.

14. The method of claim 7 wherein the processing information associated with the second supervisory signal and the first data signal comprises combining the second supervisory signal and the first data signal to an electrical signal and converting the combined electrical signal into the first optical signal.

15. An apparatus for processing a supervisory signal for optical network applications, the apparatus comprising:
a subcarrier transmission system including a modulator, a radio-frequency (RF) source, and a first RF band-pass filter, the RF source generating a RF signal in a first subcarrier frequency, the modulator being configured to receive a first supervisory signal and the RF signal and output a modulated RF signal based on the first supervisory signal, the first RF band-pass filter being configured to filter the modulated RF signal and output a second supervisory signal;
an electrical-to-optical conversion system configured to receive the second supervisory signal and a first data signal and output a first optical signal;
an optical-to-electrical conversion system configured to receive the first optical signal and output a first electrical signal, the first electric signal including information associated with the first data signal and the second supervisory signal;
a subcarrier reception system including a second RF band-pass filter and a demodulator, the second RF band-pass filter being configured to receive a portion of the first electrical signal, the demodulator being configured to receive the filtered portion of the first electric signal and output a third supervisory signal;
wherein the first RF band-pass filter and the second RF band-pass filter having a 3 dB transmission bandwidth equal to a data rate of the first supervisory signal;
wherein the second supervisory signal is associated with a modulation depth no more than 2% power of the first data signal;

wherein the first optical signal is associated with a perturbation to the first data signal by the second supervisory signal, the perturbation being smaller than or equal to 1 dB;

wherein the first optical signal is associated with a signal-to-noise ratio for the second supervisory signal relative to the first data signal, the signal-to-noise ratio being larger than or equal to 20 dB;

a ratio of the first subcarrier frequency to the first data frequency ranges from 0.8 to 1.

16. The apparatus of claim 15 wherein:
the second supervisory signal is associated with the first subcarrier frequency;
the first data signal is associated with a first data bandwidth, the first data bandwidth including a first data frequency, at the first data frequency a power density of the first data signal substantially equal to zero.

17. The apparatus of claim 15 wherein the first supervisory signal is associated with a first subcarrier data rate larger than 1 Mbps.

18. The apparatus of claim 17 wherein the first subcarrier data rate is larger than 5 Mbps.

19. The apparatus of claim 15 wherein the third supervisory signal is substantially the same as the first supervisory signal.

20. The apparatus of claim 15 wherein the optical-to-electrical conversion system comprises:
an optical-to-electrical signal converter configured to receive the first optical signal and configured to output the first electrical signal;
a clock and recovery system configured to receive a portion of the first electrical signal, reduce signal distortion, and output the second data signal;
wherein the second data signal is substantially the same as the first data signal.

21. The apparatus of claim 15 wherein the electrical-to-optical conversion system comprises:
a laser source configured to receive the second supervisory signal for generating a laser signal;
an electrical-to-optical modulator coupled to the laser source and configured to receive at least the first data signal for modulating the laser signal and output the first optical signal.

22. A method for processing a supervisory signal for optical network applications, the method comprising:
receiving a first supervisory signal;
generating a RF signal having a subcarrier frequency;
modulating the RF signal based on the first supervisory signal;
processing information associated with the modulated RF signal by filtering through a first RF band-pass filter, the first RF band-pass filter having a —3 dB transmission bandwidth substantially equal to a data rate of the first supervisory signal;
outputting a second supervisory signal;
receiving the second supervisory signal and a first data signal; processing information associated with the second supervisory signal and the first data signal;
outputting a first optical signal based on at least information associated with the second supervisory signal and the first data signal;
receiving the first optical signal;
processing information associated with the first optical signal;
outputting a first electrical signal and a second data signal based on at least information associated with the first optical signal;

filtering a portion of the first electric signal through a second RF band-pass filter, the second RF band-pass filter being substantially the same as the first RF band-pass filter;
processing information associated with the filtered portion of the first electrical signal;
outputting a third supervisory signal;
wherein the second supervisory signal is associated with a modulation depth no more than 2% power of the first data signal;
wherein the first optical signal is associated with a perturbation to the first data signal, the perturbation being smaller than or equal to 1 dB;
wherein the first optical signal is associated with a signal-to-noise ratio for the second supervisory signal, the signal-to-noise ratio being larger than or equal to 20 dB;
a ratio of the first subcarrier frequency to the first data frequency ranges from 0.8 to 1.

23. The method of claim 22 wherein the first supervisory signal is associated with a first supervisory data rate larger than 1 Mbps.

24. The method of claim 23 wherein the first supervisory data rate is about 5 Mbps.

25. The method of claim 22 wherein:
the second supervisory signal is associated with a first subcarrier frequency;
the first data signal is associated with a first data bandwidth, the first data bandwidth including a first data frequency, at the first data frequency a power density of the first data signal substantially equal to zero.

26. The method of claim 25 wherein the first data frequency is a maximum frequency associated with the first data bandwidth.

27. The method of claim 26 wherein the first data frequency is substantially equal to 2.5 GHz and the first subcarrier frequency is substantially equal to 2.4 GHz.

28. The method of claim 22 wherein the processing information associated with the filtered portion of the first electrical signal comprises:
demodulating the filtered portion of the first electrical signal.

29. The method of claim 22 further comprising:
receiving another portion of the first electrical signal;
reducing signal distortion associated with the received portion of the first second electrical signal; and
output a second electrical signal that is a replica of the first data signal.

30. The method of claim 22 wherein the processing information associated with the second supervisory signal and the first data signal comprises:
generating a laser signal in response to at least the second supervisory signal;
modulating the laser signal with the first data signal;
converting the modulated laser signal to the first optical signal.

31. The method of claim 22 wherein the processing information associated with the second supervisory signal and the first data signal comprises converting a combined signal of the second supervisory signal and the first data signal into the first optical signal.

32. An apparatus for transmitting a supervisory signal for optical network applications, the apparatus comprising:
a subcarrier transmission system including a modulator, a radio-frequency (RF) source, and a first RF band-pass filter, the RF source generating a RF signal in a first subcarrier frequency, the modulator being configured to receive a first supervisory signal and the RF signal and output a modulated RF signal based on the first supervisory signal, the first RF band-pass filter being configured to filter the modulated RF signal with a 3dB transmission bandwidth equal to a data rate of the first supervisory signal and output a second supervisory signal;

an electrical-to-optical conversion system configured to receive the second supervisory signal and a data signal and output an optical signal;

wherein the second supervisory signal is associated with a modulation depth no more than 2% power of the first data signal;

wherein the optical signal is associated with a perturbation to the data signal, the perturbation being smaller than or equal to 1 dB;

wherein the optical signal is associated with a signal-to-noise ratio for the second supervisory signal, the signal-to-noise ratio being the subcarrier power over the data signal power within the 3 dB transmission bandwidth of the RF band-pass filter, and being larger than or equal to 20 dB;

a ratio of the subcarrier frequency to the data frequency ranges from 0.8 to 1.

33. The apparatus of claim 32 wherein: the second supervisory signal is associated with a subcarrier frequency;

the data signal is associated with a data bandwidth, the data bandwidth including a data frequency, at the data frequency a power density of the data signal substantially equal to zero.

34. The apparatus of claim 32 wherein the first supervisory signal is associated with a subcarrier data rate larger than 1 Mbps.

35. The apparatus of claim 34 wherein the subcarrier data rate is larger than 5 Mbps.

* * * * *

UNITED STATES PATENT AND TRADEMARK OFFICE
CERTIFICATE OF CORRECTION

| | | |
|---|---|---|
| PATENT NO. | : 7,421,199 B2 | Page 1 of 1 |
| APPLICATION NO. | : 11/833956 | |
| DATED | : September 2, 2008 | |
| INVENTOR(S) | : Yu Sheng Bai | |

It is certified that error appears in the above-identified patent and that said Letters Patent is hereby corrected as shown below:

Column 9, line 60, delete "$\rho_{DATA}$" and insert --$P_{DATA}$--;

Claim 1, column 12, line 54, delete "—3 dB", and insert --3 dB--;

Claim 7, column 13, line 36, delete "—3 dB", and insert --3 dB--;

Claim 22, column 15, line 52, delete "—3 dB", and insert --3 dB--;

Claim 22, column 15, line 57, delete " signal; processing information associated with the sec-", and insert
-- signal;
   processing information associated with the sec- --;

Claim 32, column 18, lines 4-5, delete "the subcarrier frequency to the data", and insert --the first subcarrier frequency to the first data--.

Signed and Sealed this

Twenty-fifth Day of November, 2008

JON W. DUDAS
*Director of the United States Patent and Trademark Office*

UNITED STATES PATENT AND TRADEMARK OFFICE
CERTIFICATE OF CORRECTION

PATENT NO.        : 7,421,199 B2  
APPLICATION NO.   : 11/833956  
DATED             : September 2, 2008  
INVENTOR(S)       : Yu Sheng Bai Page 1 of 1

It is certified that error appears in the above-identified patent and that said Letters Patent is hereby corrected as shown below:

Title page, after section "(76) Inventor," add --(73) Assignee: FutureWei Technologies, Inc., Plano, TX (US)--

Signed and Sealed this

Twenty-eighth Day of April, 2009

JOHN DOLL  
*Acting Director of the United States Patent and Trademark Office*